Dec. 7, 1943.  A. G. HORVATH  2,336,150
AIRPORT GASOLINE DISPENSING SYSTEM
Filed June 24, 1940  5 Sheets-Sheet 1
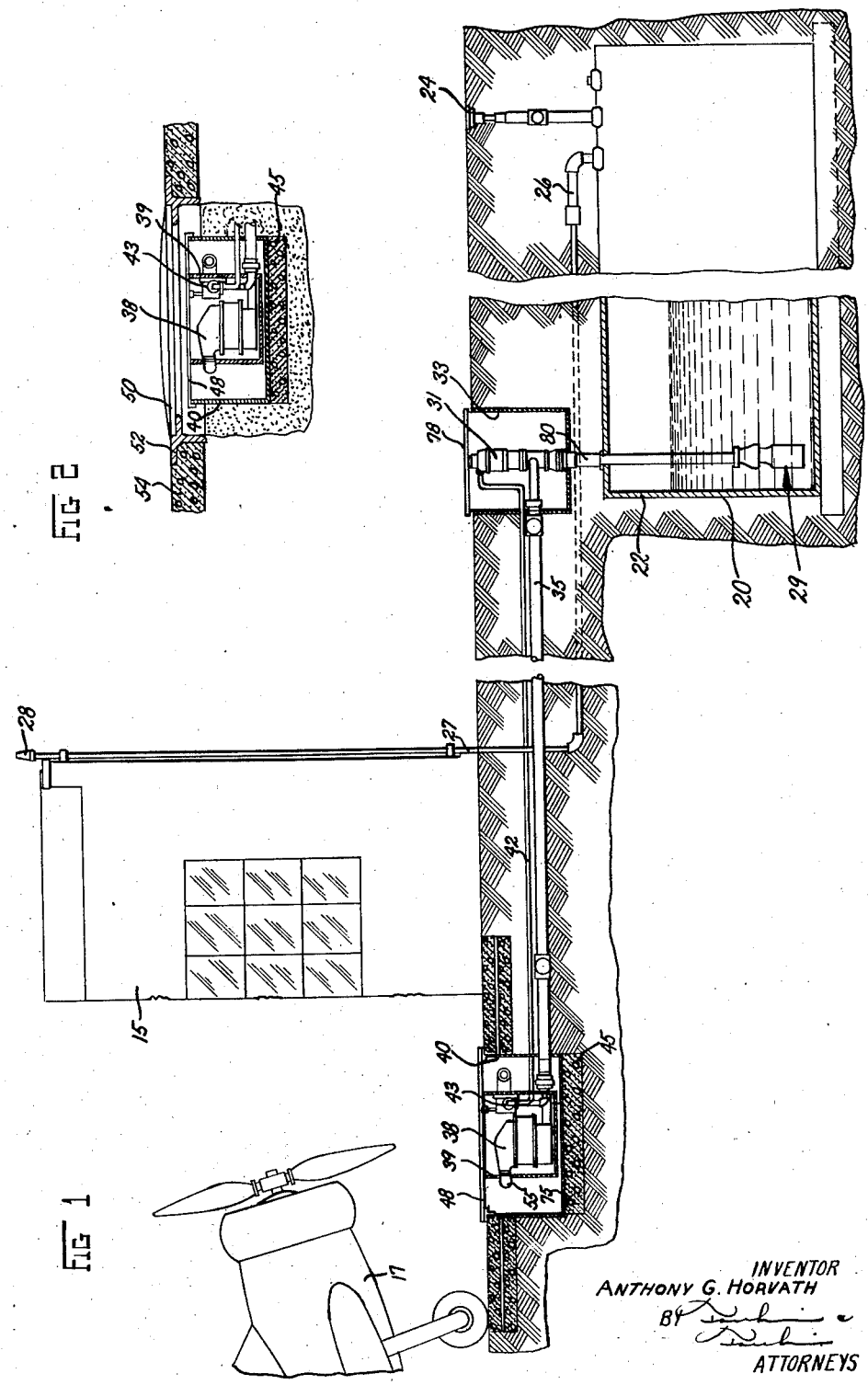
INVENTOR
ANTHONY G. HORVATH
BY
ATTORNEYS Dec. 7, 1943.  A. G. HORVATH  2,336,150
AIRPORT GASOLINE DISPENSING SYSTEM
Filed June 24, 1940  5 Sheets-Sheet 2
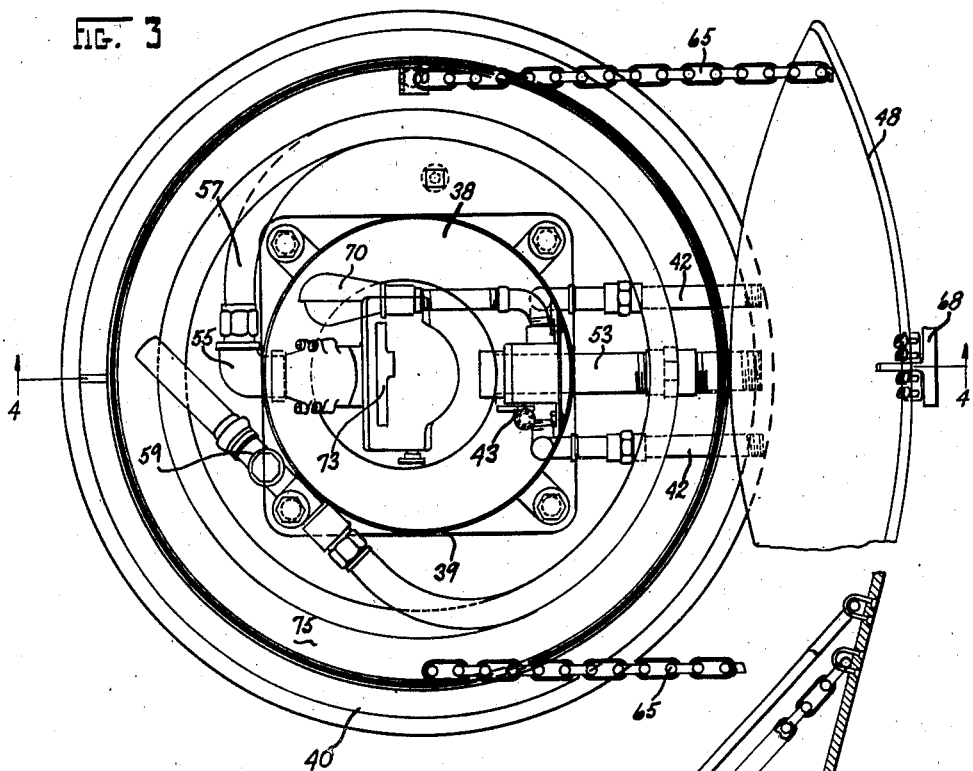
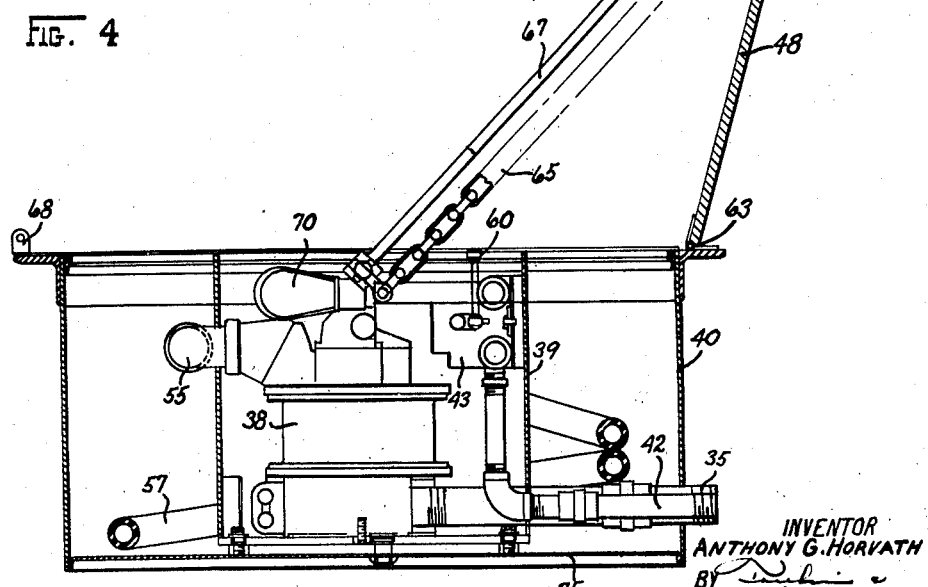
INVENTOR
ANTHONY G. HORVATH
BY
ATTORNEYS

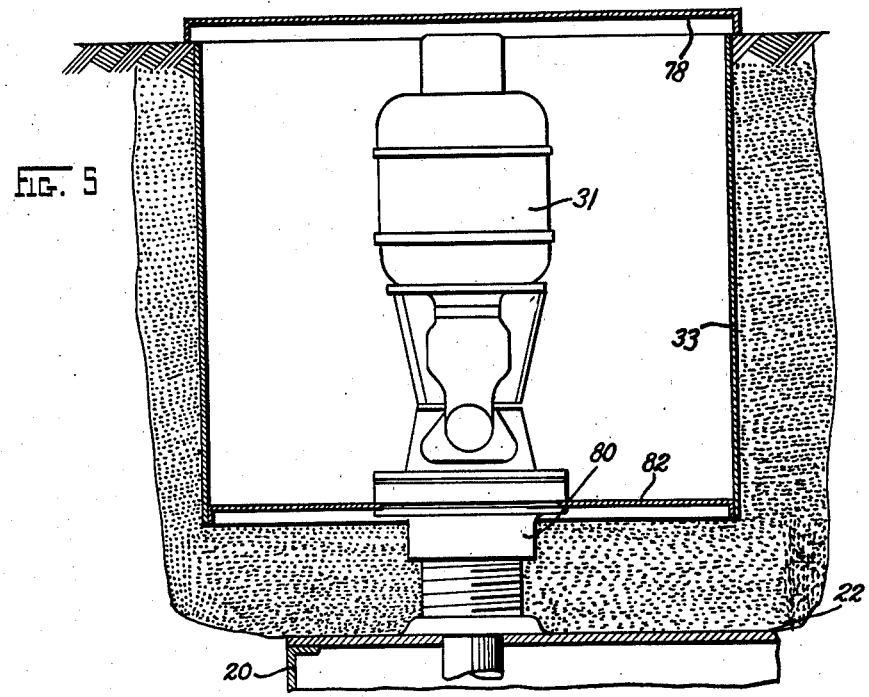
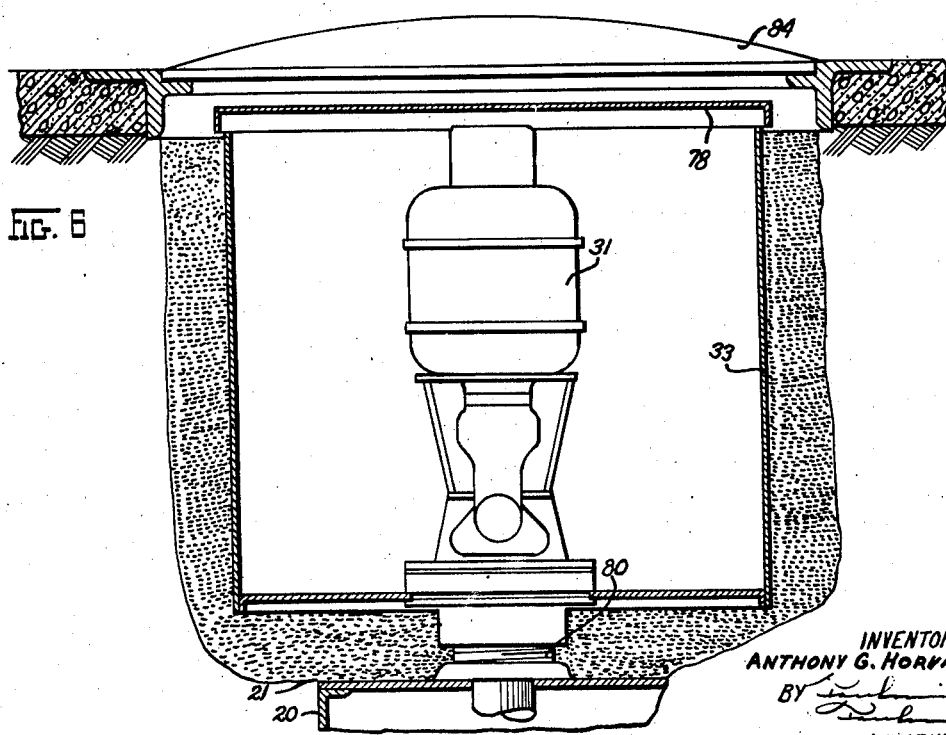

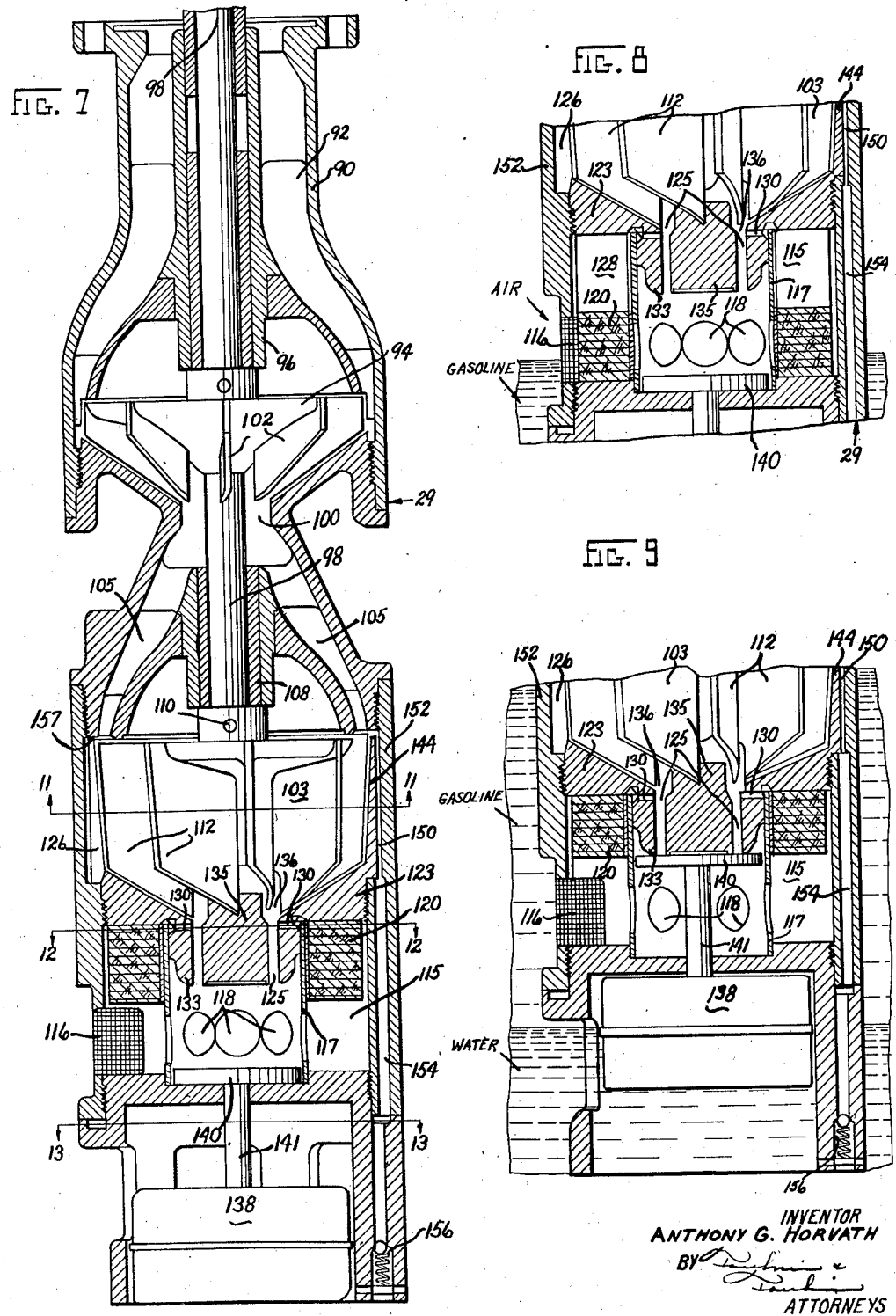

Dec. 7, 1943.  A. G. HORVATH  2,336,150
AIRPORT GASOLINE DISPENSING SYSTEM
Filed June 24, 1940   5 Sheets-Sheet 5

INVENTOR
ANTHONY G. HORVATH
ATTORNEYS

Patented Dec. 7, 1943

2,336,150

UNITED STATES PATENT OFFICE 2,336,150

AIRPORT GASOLINE DISPENSING SYSTEM

Anthony G. Horvath, Dayton, Ohio, assignor to The Dayton Pump and Manufacturing Company, Dayton, Ohio, a corporation of Ohio Application June 24, 1940, Serial No. 341,997

5 Claims. (Cl. 210—44)

This invention relates to fluid dispensing systems and more particularly to an apparatus for dispensing gasoline, oil, and the like, to aircraft and marine craft at airports and boat landings.

It is an object of this invention to provide an improved gasoline dispensing apparatus which comprises a complete fluid dispensing system for use at airports or water fronts to fuel aircraft as well as watercraft.

Another object of this invention is to provide a gasoline dispensing system which is disposed entirely under ground or water surface so as not to interfere with the movement of the craft over the surface of the dispensing apparatus when not in use.

Another object is to provide an improved fluid dispensing apparatus comprising a storage tank for containing the liquid to be dispensed and a watertight pit thereabove to house the pump and mechanism for dispensing the fluid from the storage tank and wherein the mechanism in the pit is contained within a metal watertight container which is placed underground.

Another object is to provide an improved gasoline dispensing apparatus for fueling aircraft and the like wherein the entire fluid dispensing apparatus is installed underground so as to enable the aircraft to travel over the top of the dispensing apparatus without injury to it.

Another object is to provide an improved centrifugal pumping unit for an underground gasoline dispensing system wherein the pump is of the impeller type comprising two impellers and wherein provision is made for separating water from the gasoline being carried out through the discharge conduits of the dispensing unit.

Another object is to provide an improved gasoline dispensing pumping unit for airports wherein a centrifugal pumping unit is employed having an air and water lock. To this end use is made of a copper float for cutting off the delivery of fluid when water raises too high in the storage tank and an additional cork float is provided to cut off the flow of gasoline when the storage tank becomes substantially dry and air is being pumped into the dispensing system.

Still another object is to provide an improved fluid dispensing system for airports and water ports whereby air and water craft can be fueled wherein the complete fluid dispensing sytsem is mounted underground and/or beneath the surface of the water and composed of a centrifugal pumping unit connected to a fluid storage tank and provided with a meter which is housed in a watertight pit tank having sufficient length of hose and nozzle means to permit dispensing of the fluid into the storage tank of the air or water craft.

Still another object is to provide an improved gasoline dispensing system comprising a centrifugal pumping unit, storage tank, and fluid metering means, all of which are disposed underground and arranged whereby the metering means may be installed at a distant point on the airport field or wharf to eliminate the necessity of bringing the aircraft in close to the gasoline storage tank while refueling the plane, the distance between the pumping unit and meter being readily varied since the liquid being dispensed is pushed to the meter and not pulled as in the case of the conventional fluid dispensing systems commonly in use. This improved fluid dispensing system eliminates the use of air separators and permits handling liquids of high volatility in very hot weather without difficulty.

These and other objects and advantages will become apparent from the following description taken in connection with the drawings.

In the drawings:

Figure 1 is a diagrammatic elevational view, partly in section, of an airport gasoline dispensing system embodying this invention;

Figure 2 is a vertical sectional view taken through the pit tank and watertight housing enclosing the motor switch, metering and liquid dispensing hose and nozzle means for operating the pumping unit, as illustrated in Figure 1, and showing a modified cover construction;

Figure 3 is a plan view of the housing for the motor switch and metering means illustrated in Figure 2 showing the pit tank hinged lid open;

Figure 4 is a vertical sectional view taken on the line 4—4 of Figure 3;

Figure 5 is a vertical sectional view taken through the pit tank housing the motor for operating the centrifugal pump, wherein the pit tank cover is disposed above the ground;

Figure 6 is a similar vertical sectional view of a modified pit tank for housing the motor beneath the ground, utilizing the manhole cover for permitting access to the pit tank;

Figure 7 is a vertical sectional view taken through the centrifugal pump and showing the dual impeller construction;

Figure 8 is a fragmentary detail sectional view illustrating the air lock float in position to close the gasoline intake to prevent air being drawn into the dispensing system when the gasoline level has reached a predetermined low point;

Figure 9 is a similar fragmentary detail sectional view illustrating the operation of the water lock mechanism for stopping the flow of gasoline through the intake when the water level in the storage tank has reached a predetermined height;

*General arrangement*

Figure 11:
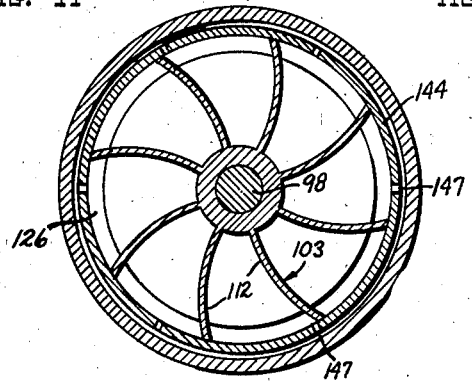
Figure 11 is a sectional view taken on the line 11—11 of Figure 7 looking in the direction of the arrows.

Referring to the drawings in detail, there is illustrated in Figure 1 an airport filling station 15 embodying an underground gasoline dispensing system of this invention for fueling airplanes and and the like craft, such as shown at 17. The underground fuel dispensing system comprises the storage tank 20 disposed beneath the ground, as shown at 22. This tank is provided with the usual filling conduit means 24 which extends to the surface of the ground, as illustrated in Figure 1. An air vent pipe means 26 communicating with the top of the storage tank is connected with a pipe 27 which extends above the ground a sufficient height to provide for proper venting of the vapors into the atmosphere above the building or place where the operator is stationed. The top of the vent pipe 27 is preferably provided with a screened exhaust opening as indicated at 28.

In the storage tank 20 is installed a centrifugal pumping unit, generally designated 29, which is disposed near the bottom of the tank, as shown in Figure 1. The centrifugal pump is driven by a motor 31 arranged in the pit tank 33. This motor is preferably disposed above and outside the storage tank, being housed in a watertight compartment, such as provided for by the pit tank 33, as illustrated in Figure 1. A discharge line 35 is connected to the pumping unit 31 and communicates with a meter, generally designated 38 housed in the inner compartment 39 located in a second watertight pit tank 40 disposed beneath the ground at the point where the liquid is to be dispensed. Electrical conduit means 42 is provided for making the necessary electrical connections from the motor 31 to the motor control switch 43 disposed in the meter compartment 39 of the pit tank 40.

*Meter and dispensing unit construction*

The meter 38, motor control switch and associated mechanism are mounted in the pit tank 40, as shown in Figures 1 and 2. This pit tank is preferably set on a concrete base 45 and may be placed in the ground so that the cover member 48 projects slightly above the ground, as shown in Figure 1, or where it is desired to permit driving of a truck or plane over the pit, the same is buried in the ground and a manhole cover means 50 is arranged thereover, as shown in Figure 2. In this type of construction, the manhole cover 50 is arranged to fit on an annular ring 52 set in the concrete surface portion 54 and arranged over the pit tank 40.

Compactly arranged in the compartment 39 is the meter 38 through which fluid being dispensed is pumped by way of pipe 35. Connected to the discharge conduit 55 of the meter is a fluid delivery hose 57. A nozzle valve means 59 is provided on the end of the hose 57 for controlling the flow of fluid through the hose during the dispensing operation. The particular construction and operation of the meter, fluid dispensing hose and nozzle mechanism do not form any part of this invention and are of the conventional type now in use.

A motor control switch 43 located in the meter pit tank 39 is preferably of the double pole type and is arranged to be manually closed and automatically opened or shut off when the lid 48 of the meter pit tank 39 is closed. For this purpose, a button operated switch 60 is arranged, as shown in Figure 4, so that when the lid 48 is placed down on the meter pit tank in a closed position it contacts the member 60 and opens the switch to shut off the motor driving the centrifugal pump. Preferably the cover member 48 is hinged onto the pit tank 40, as at 63, and is provided with a chain 65 and rod 67 for supporting the lid when it is in open position, as shown in Figure 4. Means is also provided for locking the cover in closed position by fastening the lid to the bracket 68 by means of a lock or other suitable means.

In order to light the interior of the meter pit tank 39 there is arranged an electric light means 70 over the meter so as to light the counter window opening 73 so as to read the numerals on the counter mechanism. This light is preferably controlled by the power switch and is automatically lighted when the meter pit tank cover is opened. The compartment 39 of the pit tank 40 in which the meter and associated dispensing mechanism are housed is suitably bolted, or otherwise fastened, to the bottom wall 75 of the pit tank 40, as shown in Figure 4, which tank is made water-tight. Preferably the pit tank is formed of galvanized metal and is painted with suitable coating material, such as aluminum, bronze and like corrosive-resisting coating compositions.

*Motor and housing for the centrifugal pumping unit*

The motor 31 for operating the centrifugal pumping unit 29 is positioned in the pit tank 33 immediately above and outside the liquid storage tank 20, as shown in Figure 1. A cover member 78 is arranged to fit over the opening in the upper end of the tank. The motor pit tank 33 is constructed so as to be watertight and may be provided with a hinged lid, not shown, to permit servicing when necessary. In the construction shown in Figure 5 the motor pit tank 33 is arranged so that the cover 78 is above the ground and the drive shaft housing portion 80 which extends through the bottom wall 82 of the pit tank is hermetically sealed thereto so as to prevent water from entering the tank.

In Figure 6 the motor pit tank 33 is disposed below the ground immediately over the liquid storage tank 20 and a manhole cover 84 is provided similarly as in the meter pit tank shown in Figure 2.

The centrifugal pumping unit and storage tank are installed at the most convenient location which will permit ready filling of the storage tank with the fluid to be dispensed. The meter pit tank and associated dispensing mechanism may be installed at some more distant point on the field or wharf to eliminate the necessity of planes or other crafts coming in close proximity to the liquid storage tank during fueling or refueling.

Centrifugal pumping unit

The centrifugal pumping mechanism is of the two-stage impeller type and the liquid being dispensed is pushed to the meter and outward through the dispensing delivery means and is not pulled as with conventional systems. In the construction shown in Figures 7 to 10, inclusive, a pump housing 90 is provided having the outlet passageway 92 and the impeller member 94 which is rotatably mounted on the thrust bearing member 96. The drive shaft 98 is suitably coupled so as to be driven by the motor 31 which is preferably of the explosion-proof type. The pump housing 90 is restricted, as at 100, directly beneath the impeller blade members 102 of the impeller 94. Below the impeller 94 is a second impeller 103 having a discharge passageway 105 which communicates with the chamber 100 beneath the upper impeller. The impeller 103 is similarly journaled on a central bearing 108 and keyed to an extension of the shaft 98, as shown at 110.

Below the impeller blade members 112 of the impeller 103 is provided a fluid chamber 115 through which gasoline or other fluid being dispensed from the storage tank is moved. The intake chamber 115 is provided with screen means 116 for preventing foreign matter passing into the dispensing system. Disposed centrally below the impeller blades 112 is a cylinder 117 having ports 118 which communicate with the fluid inlet chamber 115, as shown in Figure 7.

To prevent air from being drawn into the pump when the fluid being dispensed reaches a predetermined low point in the storage tank, there is provided an annular cork float means 120 which is adapted to reciprocate over the cylindrical intake member 117. In its uppermost position the cork float means 120 engages the bottom of the wall portion 123. In this position the ports 118 are open allowing the fluid to flow from the intake chamber through the ports 118 into the passageways 125 to the impeller blade chamber 126 and through the discharge passageways 105. When the cork float 120 is in its lowermost position, as shown in Figure 8, it closes the ports 118 and prevents fluid from being drawn into the impeller intake passageways 125. This functions as an air lock and under normal conditions the cork float 120 remains in its uppermost position. In the event, however, the gasoline level lowers to a point, such as shown in Figure 8, wherein air would be drawn in through the ports 118, the float is drawn down and closes the gasoline or fluid intake ports 118 preventing air from being drawn into the system.

Figure 12:
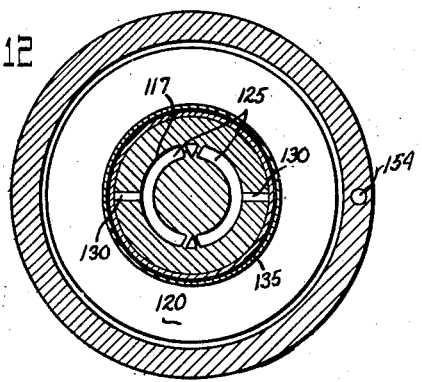
Figure 12 is a sectional view taken on the line 12—12 of Figure 7 looking in the direction of the arrows.
Figure 13:
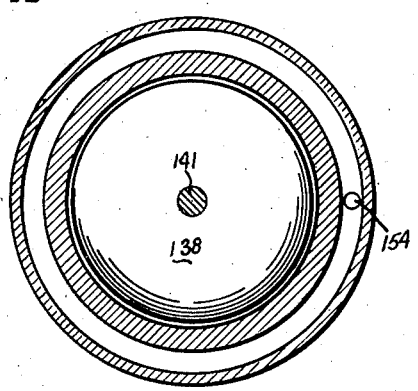
Figure 13 is a sectional view taken on the line 13—13 of Figure 7 looking in the direction of the arrows.

In order to provide efficient balanced movement of the float 120 the upper chamber or space 128 above the cork float 120 is vented by means of the passageways 130 into the passageways 125, as shown in Figures 7, 8 and 9. Intake passageways 125 are annularly shaped, as shown in Figure 12, and are disposed between the depending portion 133 and central body portion 135 forming Venturi type passageways 136. During operation of the pump the flow of fluid upward through the passageways 125 tends to withdraw fluid or air from the chamber 128 above the cork float 120 so as to provide for smooth balanced operation of the float at all times.

Water lock means is provided, as shown in Figure 9, for cutting off the gasoline fluid from entering the intake passageways 125 when the water level rises to a predetermined height in the storage tank. This mechanism comprises a float 138, which preferably is made of copper, and constructed so that it sinks in gasoline or the like density liquids but floats in water or the like liquids having greater specific gravity than gasoline. The float is located at the extreme bottom portion of the pump unit, and is arranged to operate a piston valve member 140 by means of the connecting rod 141 attached to the float. The piston valve member 140 normally remains in the position shown in Figure 8 when gasoline is being pumped. When the water level rises, as illustrated in Figure 9, so as to contact the float 138 and move it to its uppermost position in the intake cylinder 117 the ports 125 are closed stopping the flow of the fluid through the central vortex 136 of the impeller members.

Figure 10:
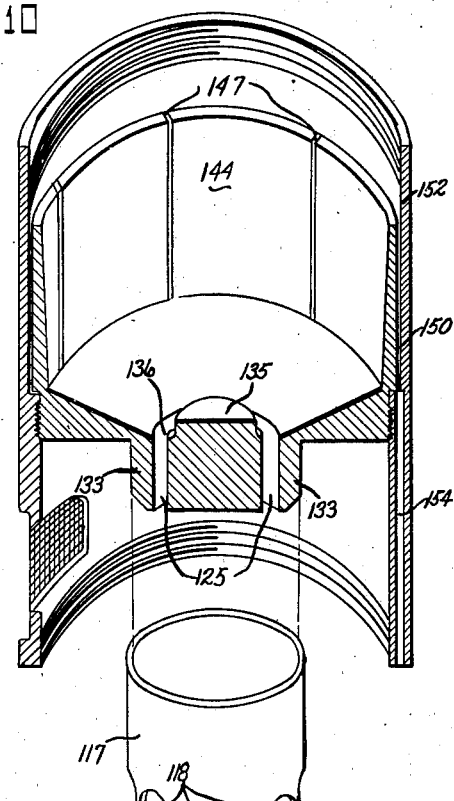
Figure 10 is an exploded sectional view of a portion of the pumping unit illustrating the arrangement of the gasoline intake, air and water lock mechanism.

In addition, means is provided for removing any water that may be carried through the intake whereby it is separated and returned to the storage tank. This means comprises the use of an inner wall housing portion 144 which forms the fluid chamber for the impeller blades 112 of the impeller 103. The wall member 144 comprises vertically disposed slots 147 which are spaced annularly therearound and communicate with an outer annular chamber 150 formed between the wall portion 144 and the impeller wall housing 152, as shown in Figure 10. A return fluid passageway 154 connects with the annular chamber 150 and allows fluid collected in the annular chamber 150 to flow back into the storage tank. A check valve 156 is positioned in the passageway 154 near the discharge opening to prevent fluid from flowing in the opposite direction.

When dispensing gasoline the fluid is drawn in through the passageways 125 into the central vortex and whirled upward by the impeller blades 112 and any water or heavier fluid is thrown to the outside of the impeller chamber against the wall 144, passing out through the vertical slots 147 in the member 144. This heavier fluid collects in the annular passageway 150 and flows back to the storage tank through the passageway 154.

An annular ledge is formed at the top of the impeller housing as at 157 which functions to peel off the periphery of the gasoline column as it moves upward and directs its flow, along with the liquid that has passed through the vertical slots, down through the channels to the bottom of the pump and thence through the passageway 154 to the storage tank.

The operation of the centrifugal pump and associated mechanism will be understood from the foregoing description.

During the normal operation of the centrifugal pump wherein the gasoline or fluid being dispensed from the storage tank is filled to a substantial extent the air lock float 120 and water lock float means 138 will be in the position shown in Figure 7. Any small amount of water which may be in the gasoline will be separated out as it passes through the centrifugal impeller 103 before it reaches the upper impeller 102. By the mechanism provided, the use of air separators and the like is eliminated since the pump can not pump air when the tank in which the fluid being pumped is stored runs dry. Further, freezing and sticking of the floats 120 and 138 are prevented by the novel arrangement provided for their operation.

It will be understood that this invention is not limited to the particular details of construction illustrated and that various changes can be made to suit different conditions and uses without departing from the spirit of this invention as defined in the appended claims.

Having thus fully described my invention, what I claim as new and desire to secure by Letters Patent is:

1. In a liquid dispensing apparatus for fueling planes at air ports or watercraft at water fronts comprising a centrifugal pumping unit mounted in an underground liquid storage tank, motor means located outside of said storage tank and housed in a watertight pit tank for actuating said centrifugal pumping unit, said pumping unit comprising a plurality of impellers arranged for pumping fluid in series flow circuit, a peripheral chamber around one of said impellers, a passageway interconnecting said impeller with said fluid storage tank whereby heavier liquid impurities in the fuel are separated therefrom by said one impeller during the pumping of said fuel, another of said impellers receiving purified fluid from said one impeller for discharge therefrom.

2. In a fluid dispensing apparatus, the combination of a storage tank for holding liquid to be dispensed with a centrifugal pump means disposed therein for moving liquid from said storage tank through a delivery pipe, said centrifugal pump comprising a plurality of impeller means for pushing liquid outward through said delivery pipe, means comprising a peripheral chamber around one of said impeller means communicating with said impeller means, and means adjacent the periphery of said one impeller means for peeling off a peripheral portion of the liquid column being pushed outward through said delivery pipe by said one impeller means and directing its flow in a reverse direction through said peripheral chamber back into said storage tank.

3. In a fluid dispensing apparatus, the combination of a storage tank for holding liquid to be dispensed with a centrifugal pump means disposed therein for moving liquid from said storage tank through a delivery pipe, said centrifugal pump comprising a plurality of impeller means for pushing liquid outward through said delivery pipe, means for rotating said impeller means, means comprising a peripheral chamber around one of said impeller means, communicating with said impeller means, and means adjacent the periphery of said one impeller means for peeling off a peripheral portion of the liquid column being pushed outward through said delivery pipe by said impeller means and directing its flow in a reverse direction through said peripheral chamber and passage means associated therewith back into said storage tank, another of said impeller means receiving the fluid that passes by said last mentioned means for delivery to the delivery pipe.

4. In a fluid dispensing apparatus, the combination of a storage tank for holding liquid to be dispensed with a centrifugal pump means disposed therein for moving liquid from said storage tank through a delivery pipe, said centrifugal pump comprising a plurality of impeller means for pushing liquid outward through said delivery pipe, means for rotating said impeller means, means comprising a peripheral chamber communicating with said impeller means, and means for peeling off a peripheral portion of the liquid column being pushed outward through said delivery pipe by said impeller means and directing its flow in a reverse direction through said peripheral chamber and passage means associated therewith back into said storage tank, including ledge means adjacent the periphery of one of said impeller means and vertical slot means in the wall of said peripheral chamber interconnecting said chamber and said one impeller means, another of said impeller means receiving the liquid that passes by said peeling means for delivery to the delivery pipe.

5. In a gasoline dispensing apparatus, the combination of a storage tank for holding gasoline to be dispensed, a centrifugal pump means disposed in said storage tank and adapted to be covered by gasoline, a delivery conduit connected to said pump through which gasoline is removed from said storage tank, said centrifugal pump comprising vertically arranged impeller blade means operating within a substantially vertically walled impeller chamber for pushing liquid outward through said delivery conduit, means forming a chamber around said impeller chamber and vertical slot means in the wall of said impeller chamber connecting the same with said chamber therearound for separating the liquid of greater specific gravity than the gasoline being pumped, and means directing its flow from said second mentioned chamber back into said storage tank.

ANTHONY G. HORVATH.